(12) United States Patent
Turner et al.

(10) Patent No.: US 11,489,763 B2
(45) Date of Patent: Nov. 1, 2022

(54) DATA HIERARCHY PROTOCOL FOR DATA TRANSMISSION PATHWAY SELECTION

(71) Applicant: Niantic, Inc., San Francisco, CA (US)

(72) Inventors: Peter James Turner, Redwood City, CA (US); Fang-Pen Lin, Santa Clara, CA (US); Paulo Francisco Zemek, Los Angeles, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 17/127,999

(22) Filed: Dec. 18, 2020

(65) Prior Publication Data

US 2021/0194794 A1 Jun. 24, 2021

Related U.S. Application Data

(60) Provisional application No. 62/951,926, filed on Dec. 20, 2019.

(51) Int. Cl.
*H04L 45/24* (2022.01)
*H04L 45/42* (2022.01)
(Continued)

(52) U.S. Cl.
CPC ............ *H04L 45/24* (2013.01); *H04L 9/0825* (2013.01); *H04L 43/0817* (2013.01); *H04L 43/0852* (2013.01); *H04L 45/42* (2013.01)

(58) Field of Classification Search
CPC ..... H04L 45/302; G06Q 30/02; G06K 9/3216
See application file for complete search history.

(56) References Cited

U.S. PATENT DOCUMENTS 6,865,169 B1 3/2005 Quayle et al.
8,619,756 B2 * 12/2013 Das .................. H04L 45/302
370/351

(Continued)

FOREIGN PATENT DOCUMENTS

CN 102843349 A 12/2012
CN 102984186 A 3/2013
(Continued)

OTHER PUBLICATIONS

PCT International Search Report and Written Opinion, PCT Application No. PCT/IB2020/062243, dated Mar. 29, 2021, 12 pages.
(Continued)

*Primary Examiner* — Mahran Y Abu Roumi
(74) *Attorney, Agent, or Firm* — Fenwick & West LLP

(57) ABSTRACT

A dataflow hierarchy protocol is implemented by one or more devices to optimize how the one or more devices process datagrams for network communications. The dataflow hierarchy considers various available network pathways for dataflow. A device implementing the dataflow hierarchy selects one or more of the available network pathways to provide low latency in data communication with other devices. The device may sample various available network pathways to determine pathway metrics (e.g., latency) and select one or more network pathways based on the metrics. The available network pathways can include pathways through one or more intermediary nodes, such as pathways through a game server, pathways through a cell tower, and pathways through a network.

20 Claims, 7 Drawing Sheets

(51) Int. Cl.
  *H04L 9/08*         (2006.01)
  *H04L 43/0817*      (2022.01)
  *H04L 43/0852*      (2022.01)

(56) References Cited

U.S. PATENT DOCUMENTS

| | | |
|---|---|---|
| 10,880,407 B2 | 12/2020 | Reynolds et al. |
| 2002/0186701 A1 | 12/2002 | Kaplan et al. |
| 2004/0156345 A1* | 8/2004 | Steer ............... H04L 45/12 370/395.31 |
| 2004/0203820 A1* | 10/2004 | Billhartz ............ H04L 45/26 455/450 |
| 2007/0104190 A1 | 5/2007 | Harmjanz et al. |
| 2008/0192756 A1 | 8/2008 | Damola et al. |
| 2009/0006473 A1 | 1/2009 | Elliott et al. |
| 2009/0075642 A1 | 3/2009 | Rantapuska et al. |
| 2009/0141713 A1 | 6/2009 | Beverly |
| 2011/0158171 A1 | 6/2011 | Centonza et al. |
| 2012/0195464 A1* | 8/2012 | Ahn ................. G06Q 30/02 709/227 |
| 2013/0034047 A1 | 2/2013 | Chan et al. |
| 2013/0159398 A1 | 6/2013 | Weizman |
| 2013/0178257 A1* | 7/2013 | Langseth ............ A63F 13/23 345/419 |
| 2014/0317173 A1 | 10/2014 | Kärkkäinen et al. |
| 2014/0362749 A1 | 12/2014 | Nakamoto |
| 2015/0095402 A1 | 4/2015 | Fraccaroli |
| 2015/0189008 A1 | 7/2015 | Kärkkäinen et al. |
| 2016/0142490 A1 | 5/2016 | Cho et al. |
| 2016/0150005 A1* | 5/2016 | Choi ............... H04W 60/00 455/435.1 |
| 2016/0175715 A1 | 6/2016 | Ye et al. |
| 2016/0240010 A1* | 8/2016 | Rosenthal ............ G06V 20/30 |
| 2016/0296840 A1 | 10/2016 | Kaewell et al. |
| 2017/0149656 A1 | 5/2017 | Kumar |
| 2017/0246539 A1 | 8/2017 | Schwartz et al. |
| 2017/0310500 A1 | 10/2017 | Dawes |
| 2018/0095541 A1 | 4/2018 | Gribetz et al. |
| 2018/0205773 A1 | 7/2018 | Miller |
| 2018/0213359 A1 | 7/2018 | Reinhardt et al. |
| 2018/0262432 A1 | 9/2018 | Ozen et al. |
| 2018/0352535 A1 | 12/2018 | Graziano |
| 2018/0359811 A1 | 12/2018 | Verzun et al. |
| 2020/0213258 A1 | 7/2020 | Goenka et al. |
| 2020/0402312 A1 | 12/2020 | Gratz et al. |

FOREIGN PATENT DOCUMENTS

| | | |
|---|---|---|
| EP | 3815343 A1 | 5/2021 |
| JP | 2011-188358 A | 9/2011 |
| JP | 2016-143076 A | 8/2016 |
| KR | 10-2008-0101891 A | 11/2008 |
| KR | 10-2010-0108354 A | 10/2010 |
| KR | 10-2012-0080410 A | 7/2012 |
| TW | 463840 U | 11/2001 |
| WO | WO 2011/140242 A2 | 11/2011 |
| WO | WO 2020/174404 A1 | 9/2020 |

OTHER PUBLICATIONS

China National Intellectual Property Administration, Office Action, CN Patent Application No. 201980043252.3, dated Jun. 11, 2021, ten pages.
United States Office Action, U.S. Appl. No. 16/800,551, dated Oct. 1, 2021, 11 pages.
European Patent Office, Extended European Search Report and Opinion, EP Patent Application No. 19826018.4, dated Jul. 8, 2021, nine pages.
Japan Patent Office, Office Action, JP Patent Application No. 2020-572883, dated Aug. 10, 2021, three pages.
Taiwan Intellectual Property Office, Office Action, TW Patent Application No. 109145172, dated Jul. 20, 2021, 16 pages.
PCT International Search Report and Opinion, PCT Application No. PCT/US2019/038984, dated Oct. 10, 2019, 9 pages.
PCT International Search Report and Written Opinion, PCT Patent Application No. PCT/IB2020/051614, dated Jun. 11, 2020, 10 pages.
Taiwan Intellectual Property Office, Office Action, Taiwanese Patent Application No. 108122701, dated Jan. 31, 2020, 3 pages.
European Patent Office, Extended European Search Report, European Patent Application No. 20763709.1, dated Mar. 15, 2022, nine pages.
Liu, H. et al. "Survey of State Melding in Virtual Worlds." ACM Computing Surveys, vol. 44, No. 4, Aug. 2012, pp. 1-25.
United States Office Action, U.S. Appl. No. 17/325,137, dated Mar. 15, 2022, six pages.

* cited by examiner

500

```
┌─────────────────────────────────────────────────────────────┐
│  Identify available network pathways for data transmission  │
│                          510                                │
└─────────────────────────────────────────────────────────────┘
                              ↓
┌─────────────────────────────────────────────────────────────┐
│   Detect one or more performance metrics for each of the    │
│                available network pathways                   │
│                          520                                │
└─────────────────────────────────────────────────────────────┘
                              ↓
┌─────────────────────────────────────────────────────────────┐
│  Select one or more available network pathways for use in   │
│     data transmission according to the detected metrics     │
│                          530                                │
└─────────────────────────────────────────────────────────────┘
                              ↓
┌─────────────────────────────────────────────────────────────┐
│    Transmit data via the one or more selected network       │
│                        pathways                             │
│                          540                                │
└─────────────────────────────────────────────────────────────┘
```

Providing peer-to-peer communication via a network pathway for client devices within geographic region surrounding cell tower
610

Receiving data from first client device via the network pathway, the first client device selecting the network pathway from a plurality of available network pathways
620

Transmitting the data to a second client device within geographic region
630

FIG. 6

DATA HIERARCHY PROTOCOL FOR DATA TRANSMISSION PATHWAY SELECTION

CROSS REFERENCE TO RELATED APPLICATIONS

The application claims the benefit of U.S. Provisional Application No. 62/951,926, filed Dec. 20, 2019, which is incorporated by reference in its entirety.

FIELD

The present disclosure relates to computer network protocols, and in particular to protocols for providing low-latency wireless communication between devices within physical proximity of each other.

BACKGROUND

Computer networks are interconnected sets of computing devices that exchange data, such as the Internet. Communication protocols such as the User Datagram Protocol (UDP) define systems of rules for exchanging data using computer networks. UDP adheres to a connectionless communication model without guaranteed delivery, ordering, or non-duplicity of datagrams. A datagram is a basic unit for communication and includes a header and a payload. The header is metadata specifying aspects of the datagram, such as a source port, a destination port, a length of the datagram, and a checksum of the datagram. The payload is the data communicated by the datagram. Computing devices communicating using UDP transmit datagrams to one another via the computer network.

Connectionless communication protocols such as UDP generally have lower overhead and latency than connection-oriented communication protocols like the Transmission Control Protocol (TCP), which establish connections between computing devices before transmitting data. However, existing connectionless communication protocols are inadequate for data transfers that require less latency than is accommodated by the existing art. For example, an augmented reality (AR) environment streaming at 60 frames per second (FPS) may require latency an order of magnitude lower than provided by current techniques. In such an AR environment, the frames might be spaced at approximately sixteen millisecond intervals, while current network protocols typically provide latency of approximately one hundred milliseconds (or more).

As such, with existing techniques, a user may encounter some degree of latency when interacting in the AR environment. This latency may cause interactions with an old state of AR positional data. For example, in a parallel-reality game, a player may see an AR object at an old location (e.g., where the object was 100 milliseconds previously), while the AR positional data in fact has a new location for the object (e.g. the AR object has been moved by another player). This latency in communication between the client and a server hosting or coordinating the parallel-reality game may lead to a frustrating user experience. This problem may be particularly acute where more than one user is participating in the parallel-reality game because the latency may cause a noticeable delay between the actions of one player showing up in other players' views of the AR environment. Moreover, as the number of players increases, the mismatch due to delay can further compound.

SUMMARY

Augmented reality (AR) systems supplement views of the real world with computer-generated content. Incorporating AR into a parallel-reality game may improve the integration between the real and virtual worlds. AR may also increase interactivity between players by providing opportunities for them to participate in shared gaming experiences in which they interact. For example, in a tank battle game, players might navigate virtual tanks around a real-world location, attempting to destroy each other's tanks. The movement of the tanks may be limited by real-world geography (e.g., the tanks move more slowly through rivers, move more quickly on roads, cannot move through walls, etc.).

Existing AR session techniques involve a server maintaining a master state and periodically synchronizing the local state of the environment at clients to the master state via a network (e.g., the internet). However, synchronizing a device's local state may take a significant amount of time (e.g., ~100 s of milliseconds), which is detrimental to the gaming experience. The player is, in effect, interacting with a past game state rather than the current game state. This problem may be particularly acute where more than one user is participating in the parallel-reality game because the latency causes a noticeable delay between the actions of one player showing up in other players' views. For example, if one player moves an AR object in the world, other players may not see it has moved until one hundred milliseconds (or more) later, which is a human-perceptible delay. As such, another player may try to interact with the object in its previous location and be frustrated when the game corrects for the latency (e.g., by declining to implement the action requested by the player or initially implementing the action and then revoking it when the player's client next synchronizes with the server).

This and other problems may be addressed by implementing a dataflow hierarchy protocol that optimizes how one or more devices process datagrams. The dataflow hierarchy includes various network pathways for dataflow. A device implementing the dataflow hierarchy may utilize one or more of the network pathways to ensure low latency in data communication with other devices. In some embodiments, the device samples various network pathways to determine a network pathway of minimal latency for use in data communication through an intermediary node. The various network pathways may include pathways through one or more intermediary nodes, such as pathways through the game server, pathways through a cell tower, and pathways through a network. The network pathways may also include a direct connection (e.g., using Bluetooth) between the devices. Using the dataflow hierarchy protocol may improve latency to the order of milliseconds, e.g., less than 5 milliseconds. Furthermore, the dataflow hierarchy may optimize bandwidth use according to bandwidth availability.

BRIEF DESCRIPTION OF DRAWINGS

FIG. 5 illustrates a process for using the dataflow hierarchy protocol, according to an embodiment.

FIG. 6 illustrates a process for transmitting data between clients within a geographic region surrounding a cell tower, according to an embodiment.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements.

DETAILED DESCRIPTION

Network Environment

Figure 1:
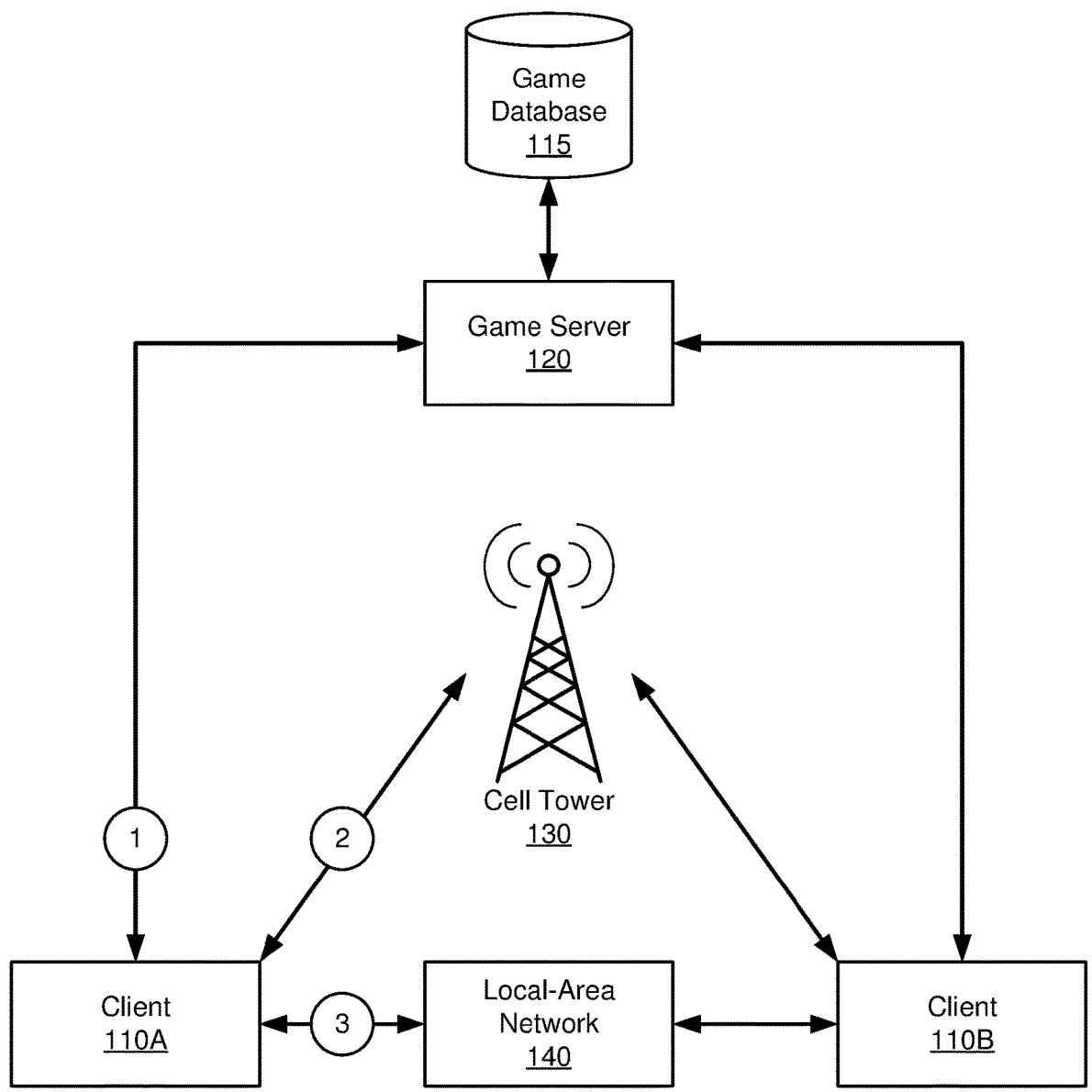
FIG. 1 illustrates a network environment in which a dataflow hierarchy protocol may be implemented, according to an embodiment.

As disclosed herein, a dataflow hierarchy protocol may provide reduced computer network latency relative to previous approaches (e.g., in one embodiment, the latency is ~10 milliseconds). FIG. 1 illustrates a computer network 100 that communicates using the dataflow hierarchy protocol, according to one embodiment. The figure illustrates a simplified example using block figures for purposes of clarity. The computer network 100 includes two clients 110, a game database 115, a game server 120, a cell tower 130, and a local-area network (LAN) 140. In other embodiments the computer network may include fewer, additional, or other components, such as additional clients 110, additional game servers 120, additional cell towers 130, or other network nodes. The clients 110 communicate with the game server 120 which hosts a parallel-reality game. Clients 110 communicate with one another during the parallel-reality game as players interact with other players of the parallel-reality game.

A client 110 is a computing device such as a personal computer, laptop, tablet computer, smartphone, or so on. Clients 110 can communicate with one another using the dataflow hierarchy protocol, e.g., while playing the parallel-reality game. In an embodiment, each client 110 includes a local AR module and the game server 120 includes a master AR module. Each local AR module communicates AR data to local AR modules upon other clients 110 and/or the master AR module upon the game server 120. The client 110 will be further described in FIG. 2.

The game server 120 is similarly a computing device that hosts the parallel-reality game played by various clients 110. The game server 120 establishes connections between clients 110 to receive and transmit information of parallel-reality game states. The game server 120 stores player profiles, game states, maps (real and virtual), and other information relevant to the parallel-reality game in the game database 115. The game server 120 will be further described in FIG. 3.

The cell tower 130 is a network configured for data communication between clients 110. The cell tower 130 may facilitate data transfer between clients 110, e.g., via UDP. In one or more embodiments, the cell tower 130 has a local AR module that is configured to aid in hosting the parallel-reality game between clients 110 connected to the cell tower 130. The cell tower 130 may share game states to the game server 120, e.g., periodically or in real-time. The cell tower 130 is further described in FIG. 4.

The LAN 140 is a local network onto which clients may connect. The LAN 140 comprises one or more routers to which clients 110 may connect. The LAN 140 operates with Wi-Fi and Ethernet. The LAN 140, similarly to the cell tower 130 may comprise a local AR module configured to aid in hosting the parallel-reality game between clients 110 connected to the LAN. The LAN 140, likewise, may share game states to the game server 120

Clients 110 may communicate with one another using the dataflow hierarchy protocol, or other protocols in other embodiments. To communicate with one another, two or more clients transmit data via one or more pathways. As shown in FIG. 1, there are three pathways present in the computer network 110 between client 110A and client 110B. In a first pathway, clients 110 may communicate with one another via the game server 120, e.g., using TCP. In a second pathway, the clients 110 may communicate with one another via the cell tower 130, e.g., using TCP or UDP. In a third pathway, the clients 110 may communicate with one another via the LAN 140, e.g., using TCP or UDP. In other embodiments (not shown), there may be other pathways for communication between the clients, e.g., via Ethernet, Bluetooth, near-field communication (NFC), etc. In each of the pathways, the clients 110 communicate via an intermediary node, e.g., the game server 120, the cell tower 130, or the LAN 140. The dataflow hierarchy protocol evaluates available communication pathways between clients 110 and optimizes which one or more pathways to use in communicating data between clients 110.

In an embodiment, client 110 communications may be routed through the game server 120 or peer-to-peer (P2P). Communications routed through the game server 120 may go from a first client 110A to the game server 120 via the cell tower 130 and then back through the cell tower 130 to a second client 110B. In contrast, P2P communication may go from the first client 110A to the cell tower 130 and then directly to the second client 120B. Note that in some cases, the communications may pass through other intermediary devices, such as signal boosters. As used herein, a communication is considered P2P if it is routed to the target client 110B without passing through the game server 120. For example, a message (e.g., a datagram) may be sent P2P if the target client 110B is connected to the same cell tower 130 as the sending client 110A and routed via the game server 120 otherwise. In another embodiment, clients 110 communicate entirely using P2P. Furthermore, in some embodiments, UDP hole punching or other techniques for P2P communication involving network address translation (NAT) may be used to establish a connection among two or more clients 110.

In one embodiment, the clients 110 use a coordination service (e.g., hosted at the game server 120 and communicated via TCP) to synchronize IP addresses. The clients 110 can then communicate (e.g., via UDP) using public facing IP addresses or the LAN 140. For example, a first client 110A might send a request via TCP to the coordination service to join a local AR shared environment. The coordination service may provide the first client 110A with the IP address of a second client 110B connected to the AR environment (e.g., via the same cell tower 130). The coordination service may also provide the first client's IP address to the second client 110B or the first client 110A may provide it directly using the second client's IP address (as provided by the coordination service). In some embodiments, the coordination service may prompt the second client 110B to approve the first client 110A (e.g., by requesting user confirmation or checking a list of approved clients 110 to connect with the second client 110B) before the second client's IP address is provided.

In one embodiment, the clients 110 communicate via UDP with public facing IP addresses and the communications are secured with public-key cryptography. In particular embodiments, elliptic curve cryptography (ECC) is implemented. ECC uses an elliptic curve over a finite field that is a unidirectional and deterministic function to encrypt a private key to be publicly provided to other computing systems and networks. One benefit of ECC over other public-key cryptography methodologies is that ECC is a simpler function, allowing for smaller key sizes, consequentially reducing bandwidth usage.

Client

Figure 2:
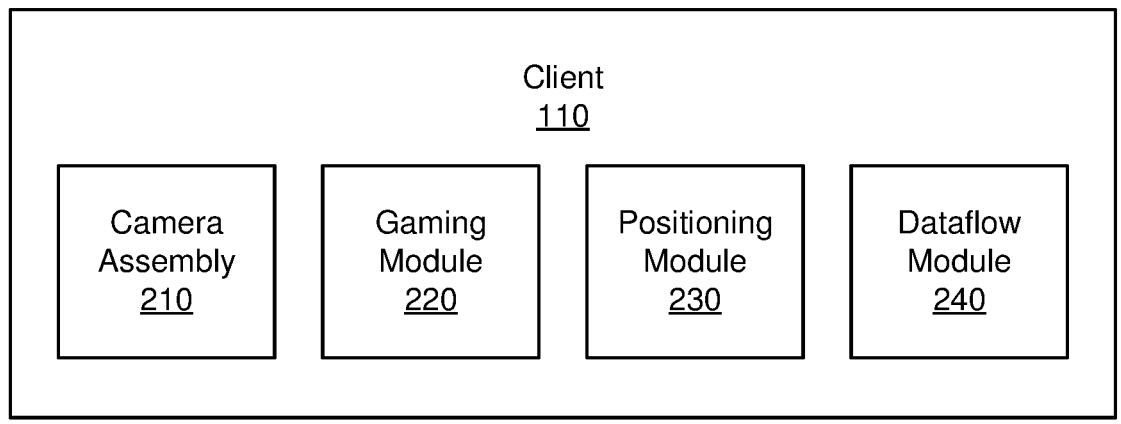
FIG. 2 is a block diagram illustrating a client, according to one embodiment.

FIG. 2 is a block diagram of the client 110, according to an embodiment. A client 110 can be any portable computing device that can be used by a player to interface with the game server 120. For instance, a client 110 can be a wireless device, a personal digital assistant (PDA), portable gaming device, cellular phone, smart phone, tablet, navigation system, handheld GPS system, wearable computing device, a display having one or more processors, or other such device. In another instance, the client 110 includes a conventional computer system, such as a desktop or a laptop computer. Still yet, the client 110 may be a vehicle with a computing device. In short, a client 110 can be any computer device or system that can enable a player to interact with the game server 120. As a computing device, the client 110 can include one or more processors and one or more computer-readable storage media. The computer-readable storage media can store instructions which cause the processor to perform operations. The client 110 is preferably a portable computing device that can be easily carried or otherwise transported with a player, such as a smartphone or tablet.

The client 110 communicates with the game server 120 to provide the game server 120 with sensory data of a physical environment. The client 110 includes a camera assembly 210 that captures image data in two dimensions of a scene in the physical environment where the client 110 is located. The client 110 also includes a depth estimation model 130 that is a machine learning model, e.g., trained by the game server 120. In the embodiment shown in FIG. 1, each client 110 includes software components such as a gaming module 220 and a positioning module 230. The client 110 may include various other input/output devices for receiving information from and/or providing information to a player. Example input/output devices include a display screen, a touch screen, a touch pad, data entry keys, speakers, and a microphone suitable for voice recognition. The client 110 may also include other various sensors for recording data from the client 110 including but not limited to movement sensors, accelerometers, gyroscopes, other inertial measurement units (IMUs), barometers, positioning systems, thermometers, light sensors, etc. The client 110 can further include a network interface for providing communications over the network 105. A network interface can include any suitable components for interfacing with one or more networks, including for example, transmitters, receivers, ports, controllers, antennas, or other suitable components.

The camera assembly 210 captures image data of a scene of the environment where the client 110 is in. The camera assembly 210 may utilize a variety of varying photo sensors with varying color capture ranges at varying capture rates. The camera assembly 210 may contain a wide-angle lens or a telephoto lens. The camera assembly 210 may be configured to capture single images or video as the image data. Additionally, the orientation of the camera assembly 210 could be parallel to the ground with the camera assembly 210 aimed at the horizon. The camera assembly 210 captures image data and shares the image data with the computing device on the client 110. The image data can be appended with metadata describing other details of the image data including sensory data (e.g. temperature, brightness of environment) or capture data (e.g. exposure, warmth, shutter speed, focal length, capture time, etc.). The camera assembly 210 can include one or more cameras which can capture image data. In one instance, the camera assembly 210 comprises one camera and is configured to capture monocular image data. In another instance, the camera assembly 210 comprises two cameras and is configured to capture stereoscopic image data. In various other implementations, the camera assembly 210 comprises a plurality of cameras each configured to capture image data.

The gaming module 220 provides a player with an interface to participate in the parallel-reality game. The game server 120 transmits game data to the client 110 for use by the gaming module 220 at the client 110 to provide local versions of the game to players at locations remote from the game server 120. The game server 120 can include a network interface for providing communications the various pathways described in FIG. 1. A network interface can include any suitable components for interfacing with one or more networks, including for example, transmitters, receivers, ports, controllers, antennas, or other suitable components.

The gaming module 220 executed by the client 110 provides an interface between a player and the parallel-reality game. The gaming module 220 can present a user interface on a display device associated with the client 110 that displays a virtual world (e.g. renders imagery of the virtual world) associated with the game and allows a user to interact in the virtual world to perform various game objectives. In some other embodiments, the gaming module 220 presents image data from the real world (e.g., captured by the camera assembly 210) augmented with virtual elements from the parallel-reality game. In these embodiments, the gaming module 220 may generate virtual content and/or adjust virtual content according to other information received from other components of the client. For example, the gaming module 220 may adjust a virtual object to be displayed on the user interface according to a depth map (e.g., determined by the depth estimation model 130) of the scene captured in the image data.

The gaming module 220 can also control various other outputs to allow a player to interact with the game without requiring the player to view a display screen. For instance, the gaming module 220 can control various audio, vibratory, or other notifications that allow the player to play the game without looking at the display screen. The gaming module 220 can access game data received from the game server 120 to provide an accurate representation of the game to the user. The gaming module 220 can receive and process player input and provide updates to the game server 120 over the network 105. The gaming module 220 may also generate and/or adjust game content to be displayed by the client 110. For example, the gaming module 220 may generate a virtual element based on depth information (e.g., as determined by the depth estimation model 130).

The positioning module 230 can be any device or circuitry for monitoring the position of the client 110. For example, the positioning module 230 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 230 may further include various other sensors that may aid in accurately positioning the client 110 location. In some embodiments, the client 110 stores a portion of the map used in the parallel reality game locally. The positioning module 230 can position the client 110 relative to the locally stored map. The positioning module 230 can also periodically synchronize the locally stored (or cached) map with map data maintained by the game server 120.

As the player moves around with the client 110 in the real world, the positioning module 230 tracks the position of the player and provides the player position information to the gaming module 220. The gaming module 220 updates the player position in the virtual world associated with the game based on the actual position of the player in the real world. Thus, a player can interact with the virtual world simply by carrying or transporting the client 110 in the real world. In particular, the location of the player in the virtual world can correspond to the location of the player in the real world. The gaming module 220 can provide player position information to the game server 120 over the network 105. In response, the game server 120 may enact various techniques to verify the client 110 location to prevent cheaters from spoofing the client 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The dataflow module 240 communicates other computing components. The dataflow module 240 may establish communication using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

In one or more embodiments, the dataflow module 240 communicates with the game server 120. The dataflow module 240 provides actions, updates to game states, requests for various content items (e.g., for the parallel-reality game) or other communications to the game server 120. The dataflow module 240 establishes a connection, e.g., via TCP, with the game server 120. TCP provides a robust manner in transmitting data. With TCP, the dataflow module 240 can detect lost packets during transmission of data and request resending the lost packets. Moreover, TCP allows for reconstruction of sequential data packets received out of order to generate the intended message.

The dataflow module 240 also manages communication with one or more other clients 110. The dataflow module 240 identifies one or more pathways for communicating with another client 110. The pathways available to the client 110 at a given time may include any combination of: a pathway through the game server 120, a pathway through the cell tower 130, a pathway through the LAN 140, another pathway through another network, and a direct connection (e.g., via Bluetooth). The dataflow module 240 implements the dataflow hierarchy protocol to select one or more available pathways for use in transmitting data between clients 110. In situations with a single available pathway, the dataflow hierarchy protocol instructs transmission of data via the sole identified pathway.

In situations with multiple available pathways, the dataflow hierarchy protocol selects one or more of the available pathways to improve latency in communicating data. The dataflow module 240 calculates one or more metrics of the available pathways that are indicative of data transmission performance by the available pathway (i.e., performance metrics). Metrics include latency (ping), jitter, data loss, connection strength (stability of the connection), bandwidth, another data transmission metric, etc. In one embodiment, the dataflow hierarchy protocol selects the pathway (or some number of pathways) with the lowest latency for use in communicating data. In other embodiments, the dataflow hierarchy protocol considers one or more other metrics in addition to or in the alternative to latency. For example, the dataflow hierarchy protocol may combine one or more metrics for each pathway in order to determine an overall score for each pathway (i.e., a pathway score). The pathway scores may be used to rank the available pathways and to select a pathway (e.g., the highest ranked pathway) or multiple pathways (e.g., some number of the highest ranked pathways), If multiple pathways are selected based on the dataflow hierarchy protocol, the multiple selected pathways may each be used to transmit separate copies of the same data in order to improve a data transmission rate. However, in such cases, there is a tradeoff to using more pathways in that sending multiple copies of the same data via different pathways increases bandwidth usage. In some embodiments, the dataflow hierarchy protocol periodically samples available pathways to re-evaluate which pathway(s) is optimal for use. For example, the dataflow hierarchy protocol evaluates the available pathways at a regular interval (e.g., every 30 seconds) to determine an optimal set of one or more pathways for use in communication. The dataflow hierarchy protocol may sample an available pathway by transmitting data to an endpoint of the available pathway, such as from the client 110A to the client 110B. Additionally, or alternatively, the dataflow hierarchy protocol may sample one or more available pathways by transmitting data to an intermediary node connected to many endpoints, such as from the client 110A to the game server 120 or the cell tower 130. In some embodiments, the dataflow hierarchy protocol selects all available pathways for use in communication. The dataflow hierarchy protocol may adjust pathway selection according to bandwidth availability. For example, in a high bandwidth availability circumstance, the dataflow hierarchy protocol may instruct selection of all available pathways. In contrast, when bandwidth availability is limited, the dataflow hierarchy protocol may select the optimal pathway (e.g., the lowest-latency pathway).

In some embodiments, the dataflow module 240 encrypts data being transmitted between clients, e.g., during a shared AR experience in the parallel reality game. The dataflow module 240 may implement various cryptography methodologies. In particular implementations, ECC is implemented to secure UDP transmissions between clients 110, e.g., via the cell tower 130 or via the LAN 140.

Game Server

Figure 3:
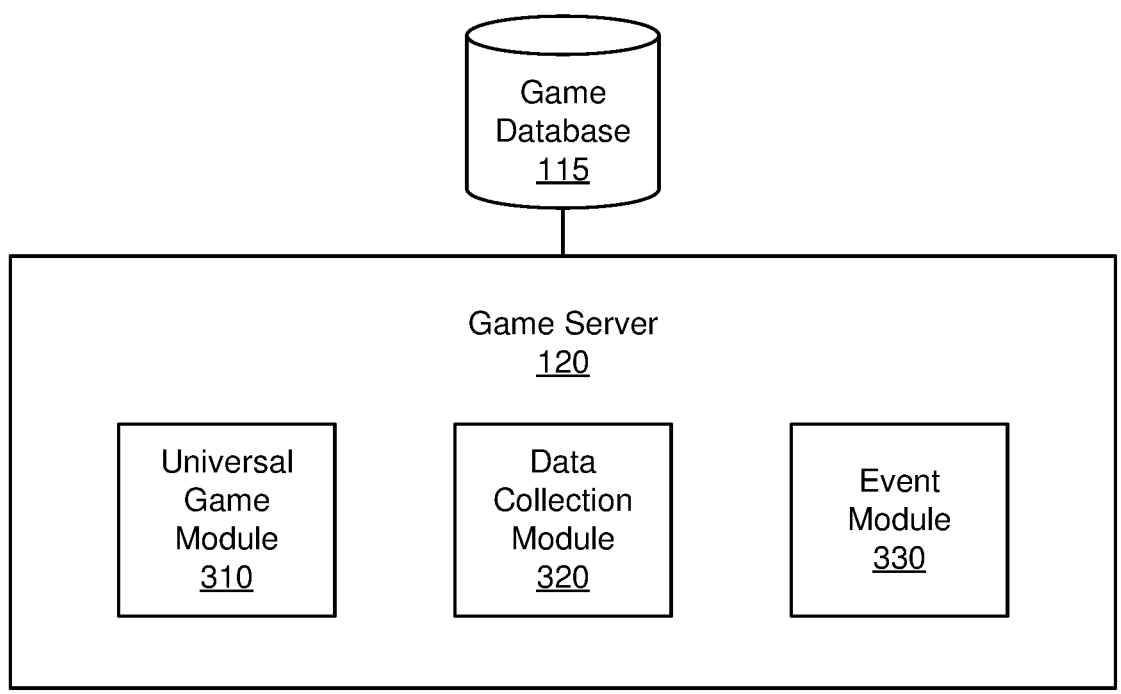
FIG. 3 is a block diagram illustrating a game server, according to one embodiment.

FIG. 3 is a block diagram illustrating the game server, according to an embodiment. The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from clients 110.

The game server 120 can be configured to receive requests for game data from a client 110 (for instance via remote procedure calls (RPCs)) and to respond to those requests. For instance, the game server 120 can encode game data in one or more data files and provide the data files to the client 110. In addition, the game server 120 can be configured to receive game data (e.g. player positions, player actions, player input, etc.) from a client 110. For instance, the client 110 can be configured to periodically send player input and other updates to the game server 120, which the game server 120 uses to update game data in the game database 115 to reflect any and all changed conditions for the game.

In the embodiment shown, the server 120 includes a universal gaming module 310, a data collection module 320, and an event module 330. As mentioned above, the game server 120 interacts with a game database 115 that may be part of the game server 120 or accessed remotely (e.g., the game database 115 may be a distributed database accessed over a network). In other embodiments, the game server 120 contains different and/or additional elements. In addition, the functions may be distributed among the elements in a different manner than described. For instance, the game database 115 can be integrated into the game server 120.

The universal game module 310 hosts the parallel reality game for all players and acts as the authoritative source for the current status of the parallel reality game for all players. As the host, the universal game module 310 generates game content for presentation to players, e.g., via their respective clients 110. The universal game module 310 may access the game database 115 to retrieve and/or store game data when hosting the parallel reality game. The universal game module 310 also receives game data from client 110 (e.g. depth information, player input, player position, player actions, landmark information, etc.) and incorporates the game data received into the overall parallel reality game for all players of the parallel reality game. The universal game module 310 can also manage the delivery of game data to the client 110 over the network 105. The universal game module 310 may also govern security aspects of client 110 including but not limited to securing connections between the client 110 and the game server 120, establishing connections between various clients 110, and verifying the location of the various clients 110.

The game server 120 can further include a data collection module 320. The data collection module 320, in embodiments where one is included, can be separate from or a part of the universal game module 310. The data collection module 320 can manage the inclusion of various game features within the parallel reality game that are linked with a data collection activity in the real world. For instance, the data collection module 320 can modify game data stored in the game database 115 to include game features linked with data collection activity in the parallel reality game. The data collection module 320 can also analyze data collected by players pursuant to the data collection activity and provide the data for access by various platforms.

The event module 330 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

Cell Tower

Figure 4:
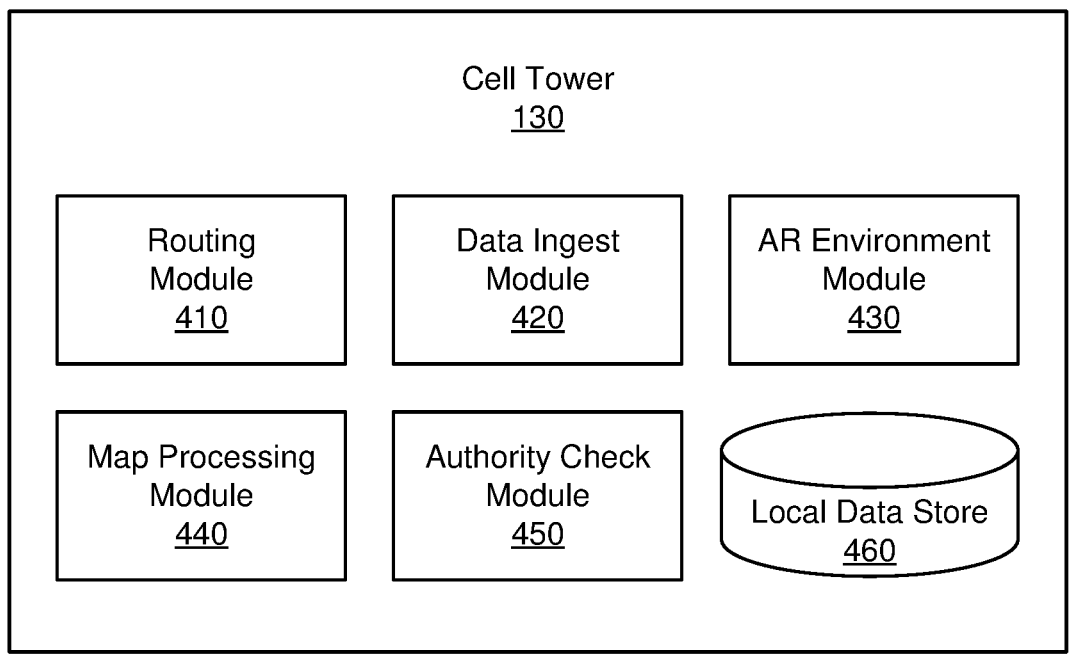
FIG. 4 is a block diagram illustrating the cell tower, according to one embodiment.

FIG. 4 is a block diagram illustrating a cell tower, according to an embodiment. In the embodiment shown, the cell tower 130 includes a routing module 410, a data ingest module 420, an AR environment module 430, a map processing module 440, an authority check module 450, and a local data store 460. The cell tower 130 also includes hardware and firmware or software (not shown) for establishing connections to the game server 120 and clients 110 for exchanging data. For example, the cell tower 130 may connect to the game server 120 via a fiberoptic or other wired internet connection and clients 110 using a wireless connection (e.g., 4G or 5G). In other embodiments, the cell tower 130 may include different or additional components. In addition, the functions may be distributed among the elements in a different manner than described. In one or more embodiments, the LAN 140 may comprise similar modules to those described for the cell tower 130, such that the LAN may likewise aid in hosting the parallel reality game.

The routing module 410 receives data packets and sends those packets to one or more recipient devices. In one embodiment, the routing module 410 receives datagrams from clients 110 sends the received datagrams to appropriate destinations. The routing module 410 may also receive data packets from the server addressed to either particular clients 110 or all clients that are connected to the cell tower 130. The routing module 410 forwards the data packets to the clients 110 to which they are addressed. In some embodiments, the routing module 410 receives information indicating a pathway selected by a sending client 110 for routing a data packet (e.g., information within the data packet), such as directly to another client 110 or through the game server 120. In this case, the routing module 410 the data packet using the selected pathway.

The data ingest module 420 receives data from one or more sources that the cell tower 130 uses to provide a shared AR experience to players via the connected clients 110. In one embodiment, the data ingest module 420 receives real-time or substantially real-time information about real-world conditions (e.g., from third party services). For example, the data ingest module 420 might periodically (e.g., hourly) receive weather data from a weather service indicating weather conditions in the geographic area surrounding the cell tower. As another example, the data ingest module 420 might retrieve opening hours for a park, museum, or other public space. As yet another example, the data ingest module 420 may receive traffic data indicating how many vehicles are travelling on roads in the geographic area surrounding the cell tower 130. Such information about real-world conditions may be used to improve the synergy between the virtual and real worlds.

The AR environment module 430 manages AR environments in which players in the geographic area surrounding the cell tower 130 may engage in shared AR experiences. In one embodiment, a client 110 connects to the cell tower 130 while executing a parallel-reality game and the AR environment module 430 connects the client to an AR environment for the game. All players of the game who connect to the cell tower 130 may share a single AR environment or players may be divided among multiple AR environments. For example, there may be a maximum number of players in a particular AR environment (e.g., ten, twenty, one hundred, etc.). Where there are multiple AR environments, newly connecting clients 110 may be placed in a session randomly or the client may provide a user interface (UI) to enable the player to select which session to join. Thus, a player may elect to engage in an AR environment with friends. In some embodiments, players may establish private AR environments that are access protected (e.g., requiring a password or code to join).

In various embodiments, to enable AR objects (e.g., creatures, vehicles, etc.) to appear to interact with real world features (e.g., to jump over obstacles rather than going through them), the AR environment module 430 provides connected clients 110 with map data representing the real world in the proximity of the client (e.g., stored in the local data store 460). The AR environment module 430 may receive location data for a client 110 (e.g., a GPS location) and provide map data for the geographic area surrounding the client (e.g., within a threshold distance of the client's current position).

The received map data can include one or more representations of the real world. For example, the map data can include a point cloud model, a plane matching model, a line matching model, a geographic information system (GIS) model, a building recognition model, a landscape recognition model, etc. The map data may also include more than one representation of a given type at different levels of detail. For example, the map data may include two or more point cloud models, each including different numbers of points.

The client 110 may compare the map data to data collected by one or more sensors to refine the client's location. For example, by mapping the images being captured by a camera on the client 110 to a point cloud model, the client's location and orientation may be accurately determined (e.g., to within one centimeter and 0.1 degrees). The client 110 provides the determined location and orientation back to the AR environment module 430 along with any actions taken by the player (e.g., shooting, selecting a virtual item to interact with, dropping a virtual item, etc.). Thus, the AR environment module 430 can update the status of the game for all players engaged in the AR environment.

The map processing module 440 updates map data based on current conditions (e.g., data from the data ingest module 420). Because the real world is not static, the map data in the local data store 460 may not represent current real-world conditions. For example, the same park trail in Vermont may look very different in different seasons. In summer, the trail might be clear and the surrounding trees will be covered in foliage. In contrast, in winter, the trail may be blocked by drifts of snow and the trees may be bare. The map processing module 440 may transform the map data to approximate such changes.

In one embodiment, the map processing module 440 retrieves current condition data to identify a transformation and applies that transformation to the map data. The transformations for different conditions may be defined by heuristic rules, take the form of trained machine-learning models, or use a combination of both approaches. For example, the map processing module 440 might receive current weather condition data, select a transformation for the current weather conditions, and apply that transformation to the map data. Alternatively, the map processing module 440 may pre-calculate the transformed maps and store them (e.g., in the local data store 460). In this case, when a client 110 connects to the cell tower, the map processing module determines the current conditions, selects the appropriate pre-calculated version of the map data, and provides that version to the client.

The authority check module 450 maintains synchronization between game states of different clients 110. In one embodiment, the authority check module 450 confirms that game actions received from clients 110 are consistent with the game state maintained by the AR environment module 430. For example, if two players both try to pick up the same in-game item, the authority check module 450 determines which player receives the item (e.g., based on timestamps associated with the requests). As described, the use of a P2P protocol and local processing at the cell tower may significantly reduce the latency of a player's actions being seen at other players' clients 110. Therefore, the likelihood (and number) of instances of such conflicts arising and being resolved by the authority check module 450 is reduced. Therefore, the AR experience may be improved.

The authority check module 450 may also maintain synchronization between its copy of the state of the AR environment (the intermediate node state) and a master state maintained by the game server 120. In one embodiment, the authority check module 450 periodically (e.g., every 1 to 10 seconds) receives global updates regarding the state of the AR environment from the game server 120. The authority check module 450 compares these updates to the intermediate node state and resolves any discrepancies. For example, if a player's request to pick up an item was initially approved by the authority check module 450 but a game update from the game server 120 indicates the item was picked up by another player (or otherwise made unavailable) before the player attempted to pick it up, the authority check module 450 might send an update to the player's client 110 indicating the item should be removed from the player's inventory.

This process may provide value for clients 110 located close to a boundary between coverage provided by two or more different cell towers 130. In this case, players whose client devices 110 are connected to different cell towers 130 may both be able to interact with the same virtual element. Thus, each individual cell tower 130 might initially approve conflicting interactions with the element from the different clients 110. In this case, the server 120 can detect the conflict after synchronizing with the different cell towers 130, and send updates to resolve the conflict (e.g., instructing one of the cell towers to revoke its initial approval of the action and update its local state accordingly).

The local data store 460 is one or more non-transitory computer-readable media configured to store data used by the cell tower. In one embodiment, the stored data may include map data, current conditions data, a list of currently (or recently) connected clients 110, a local copy of the game state for the geographic region, etc. Although the local data store 460 is shown as a single entity, the data may be split across multiple storage media. Furthermore, some of the data may be stored elsewhere in the communication network and accessed remotely. For example, the cell tower 130 may access current condition data remotely (e.g., from a third-party server) as needed.

Example Methods

FIG. 5 illustrates a process 500 for using the dataflow hierarchy protocol, according to an embodiment. The steps of FIG. 5 are illustrated from the perspective of a client 110A performing the method 500. However, some or all of the steps may be performed by other entities or components. In addition, some embodiments may perform the steps in parallel, perform the steps in different orders, or perform different steps.

The client 110A identifies 510 one or more available network pathways for data transmission. The client 110A identifies such network pathways by determining which of a set of predetermined pathways to a target client 110B are currently available to the client 110A. If the client 110A can establish a connection with the game server 120 and the target client 110B is also connected to the game server 120), then the client 110A identifies a network pathway to another client 110 via the game server 120. If the client 110A is connected to the cell tower 130, then the client 110 may determine whether the other client 110B is likewise connected to the cell tower 130. If so, then the client 110A identifies another network pathway through the cell tower 130. Moreover, if the client 110A and the other client 110B are connected to the same LAN 140, then the client 110A may identify a network pathway through the LAN 140. The client 110A may identify other networks or pathways that connect both clients 110 as other available network pathways (e.g., a direct connection between the clients 110, such as a Bluetooth connection). One or more of the network pathways may implement UDP for data transmission. For UDP pathways, the client 110 may utilize public-key cryptography for encryption of data. In particular, the client 110 may implement ECC.

The client 110A detects 520 one or more performance metrics for each of the available network pathways. The client 110A detects performance metrics by sending test data packets through the available network pathways. The data packets may request sending back another test data packet from the other client 110B. Based on the successful transmission of these test packets, the client 110A can calculate (or detect) metrics of the network pathway. Metrics include latency (ping), jitter, data loss, connection strength, bandwidth availability, etc.

The client 110A selects 530 one or more available network pathways for use in data transmission according to the detected metrics. The client 110A may consider one or more particular metrics when selecting network pathways. In one embodiment, the client 110A only considers latency (ping). In another embodiment, the client 110A considers latency and connection strength. As described previously, the client 110A may select the "best" pathway or pathways (as indicated by one or more metrics) or also select all available network pathways for use in data transmission.

The client 110A transmits 540 data via the one or more selected network pathways. In the context of a parallel reality game, the client 110A transmits game data to other clients 110 and the game server 120. Client-to-client communication is particularly efficient when holding shared AR experiences in the parallel reality game, where multiple players on their clients 110 may be interacting with one another and with the game server 120. Some of the interactions may be locally hosted by clients 110 or other networks (e.g., the cell tower 130 or the LAN 140), such that game states are not required to be synchronized by the game server 120. Locally hosting an AR experience provides for a more streamlined AR experience with low latency.

The client 110A may iterate the process 500 to periodically sample available pathways and iteratively optimize which pathways to use in maintaining the data transmission between devices.

FIG. 6 illustrates a method 600 for transmitting data between clients 110 within a geographic region surrounding a cell tower, according to an embodiment. The steps of FIG. 6 are described from the perspective of a cell tower 130 performing the method 600 to provide P2P communication between client devices 110 in a geographic region. However, some or all of the steps may be performed by other entities or components. In addition, some embodiments may perform the steps in parallel, perform the steps in different orders, or perform different steps.

In the embodiment shown in FIG. 6, the cell tower 130 provides 610 P2P communication via a network pathway for clients 110s within a geographic region surrounding the cell tower. For example, the cell tower 130 may provide P2P communication for clients s=110 providing a parallel-reality game (e.g., hosted by the game server 120). The cell tower 130 receives 620 data from a first client 110A via the network pathway. In particular, the network pathway is selected by the first client 110A from available network pathways based on one or more metrics for each of the available network pathways. For example, the first client device may select the network pathway providing P2P communication using a dataflow hierarchy protocol, as described above. The data received from the first client 110A may be associated with virtual content of an AR environment, such as AR data corresponding to geographic positions within the geographic region.

Using the network pathway, the cell tower 130 transmits 630 the data to a second client 110B within the geographic region. For example, if the data describes an update to virtual content of an AR environment associated with a parallel-reality game, the cell tower 130 may provide the update to some or all of the clients 110 of the parallel-reality game that are connected to the cell tower 130. As another example, the data may be specifically addressed to the second client 110B, such as a message or interaction with virtual content associated with a player using the second client.

Example Computer

Figure 7:
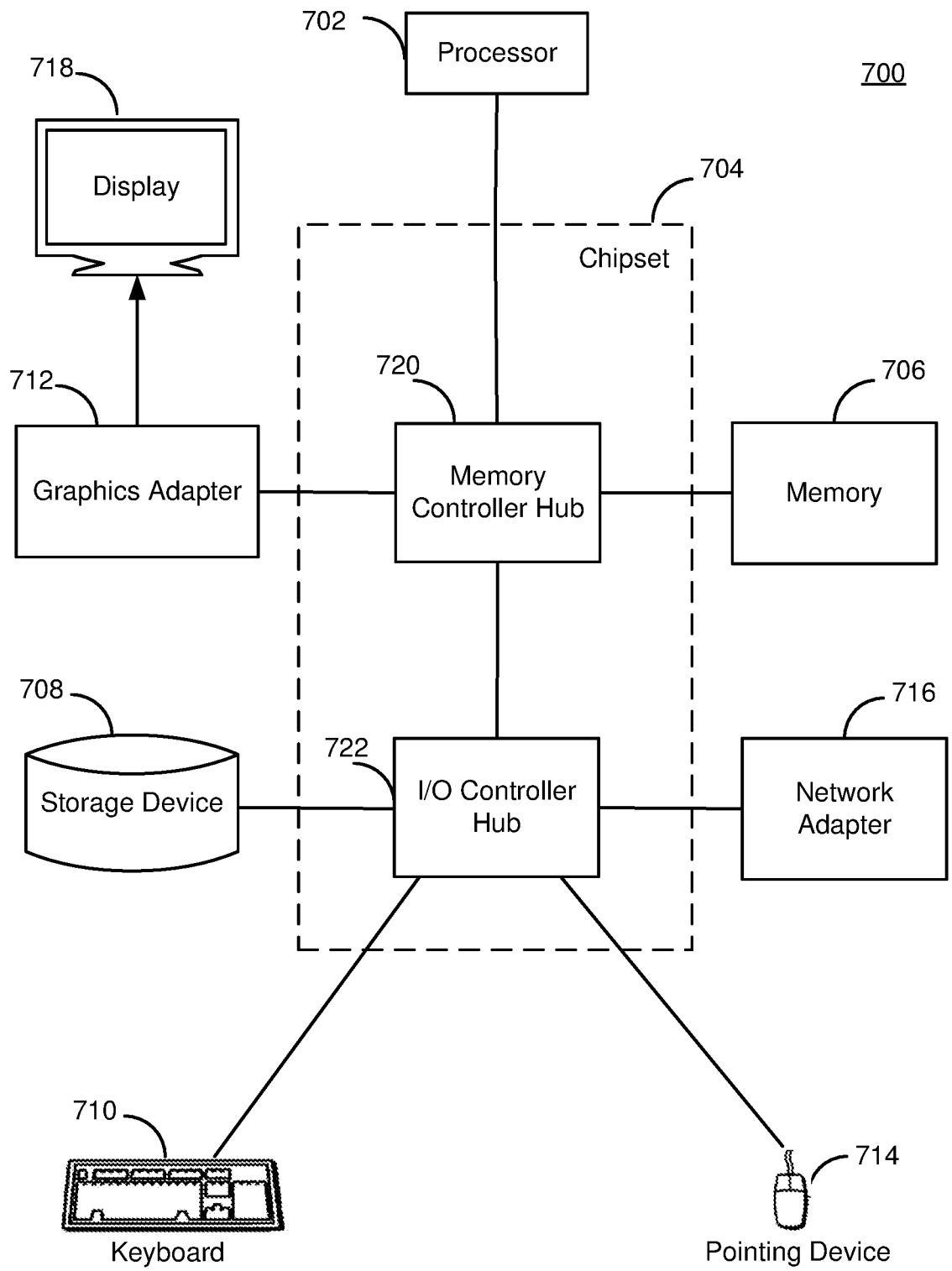
FIG. 7 is a high-level block diagram illustrating an example computer suitable for use within the computer network shown in FIG. 1, according to an embodiment.

FIG. 7 is a high-level block diagram illustrating an example computer 600 suitable for use within the computer network shown in FIG. 1, according to an embodiment. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks.

The types of computers used by the entities of FIG. 1 can vary depending upon the embodiment and the processing power required by the entity. For example, a game server 120 might include a distributed database system comprising multiple blade servers working together to provide the functionality described. Furthermore, the computers can lack some of the components described above, such as keyboards 710, graphics adapters 712, and displays 718.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer-readable medium storing instructions that, when executed by a computing device, cause the computing device to perform operations comprising:
   identifying a plurality of available network pathways for data transmission;
   detecting one or more performance metrics for each of the plurality of available network pathways;
   selecting, according to the one or more detected performance metrics, an available network pathway from the plurality of available network pathways for use in data transmission;
   transmitting data via the selected available network pathway, the data comprising data describing an action, requested by a user, associated with geolocated data;
   receiving, from a cell tower, an indication of whether the action was successfully completed, wherein the cell tower generates the indication by performing steps comprising:
      maintaining a local state of the geolocated data, the geolocated data associated with geographic positions within a geographic region surrounding the cell tower;
      receiving the data describing the action associated with the geolocated data;
      comparing the data describing the action to the local state of the geolocated data;
      responsive to determining, based on the comparison, the action does not conflict with the local state, updating the local state to reflect the action; and
      transmitting the indication of whether the action was successfully completed;
   transmitting, to the cell tower, information describing an additional action associated with the geolocated data; and
   receiving, from the cell tower, information describing a conflict between the additional action and the local state of the geolocated data, wherein the cell tower generates the information describing the conflict by performing steps comprising;
      receiving, from a server, information describing a master state of geolocated data maintained by the server;
      synchronizing the local state of the geolocated data with the master state;
      comparing the additional action to the local state of the geolocated data;
      responsive to determining, based on the comparison, that the additional action conflicts with the local state of the geolocated data, denying the additional action; and
      generating the information describing the conflict between the additional action and the local state of the geolocated data.

2. The non-transitory computer-readable medium of claim 1, wherein selecting the available network pathway comprises:
   determining a score for each of the available network pathways using the one or more detected performance metrics;
   ranking the plurality of available pathways according to the determined scores; and
   selecting the available network pathway using the ranking.

3. The non-transitory computer-readable medium of claim 1, wherein the one or performance metrics include latency, and wherein selecting the available network pathway further comprises:
   determining the latency for the selected network pathway is less than the latency of the other one or more available network pathways; and
   selecting the available network pathway based on the determination.

4. The non-transitory computer-readable medium of claim 1, wherein the one or performance metrics include bandwidth, and wherein the operations further comprise:
   responsive to determining the bandwidths of a set of the one or more available network pathways are above a bandwidth threshold, selecting each of the one or more available network pathways; and
   transmitting the data via each of the available network pathways.

5. The non-transitory computer-readable medium of claim 1, wherein the operations further comprise:
   redetecting the one or more performance metrics for each of the plurality of available network pathways;
   reselecting, according to the one or more redetected performance metrics, an available network pathway from the plurality of available network pathways for use in data transmission; and
   transmitting data via the reselected available network pathway.

6. The non-transitory computer-readable medium of claim 1, wherein the plurality of available network pathways include one or more of a pathway through a server, a pathway through a cell tower, or a pathway through local area network (LAN).

7. The non-transitory computer-readable medium of claim 1, wherein the one or more network pathways are for transmitting data between a first client and a second client, and wherein transmitting the data comprises transmitting the data by the first client to the second client via the selected available network pathway.

8. The non-transitory computer-readable medium of claim 7, wherein the operations further comprise:
   requesting, by the first client, from a network coordination service, one or more network addresses associated with a shared network environment, the shared network environment including network addresses for client devices within a geographic region;
   responsive to the request, receiving, from a network coordination service, a network address of the second client; and
   transmitting data via the selected available network pathway using the network address of the second client.

9. The non-transitory computer-readable medium of claim 7, wherein the first client and the second client are associated with public network addresses, and wherein transmitting the data comprises cryptographically securing the data via public-key cryptography.

10. The non-transitory computer-readable medium of claim 7, wherein the shared network environment is associated with an interactive application, the interactive application corresponding to geolocated data associated with geographic positions within the geographic region.

11. The non-transitory computer-readable medium of claim 1, wherein transmitting the data further comprises:
selecting, according to the one or more detected performance metrics, an additional available network pathway from the plurality of available network pathways; and
transmitting an additional copy of the data via the additional available network pathway.

12. A computer-implemented method comprising:
providing, by a cell tower, peer-to-peer communication via a network pathway for clients within a geographic region surrounding the cell tower;
receiving, from a first client within the geographic region, data and in indication of a network pathway, wherein the first client selected the network pathway based on one or more performance metrics for each of a plurality of available network pathways;
transmitting, by the cell tower, the data to a second client within the geographic region according to the selected network pathway, the data comprising data describing an action, requested by a user, associated with geolocated data;
maintaining a local state of geolocated data for an interactive application at the cell tower, the geolocated data associated with geographic positions within the geographic region surrounding the cell tower;
receiving, from the first client, information describing the action associated with the geolocated data;
comparing the action to the local state of the geolocated data;
responsive to determining, based on the comparison, the action does not conflict with the local state, updating the local state to reflect the action;
transmitting information describing the updated local state of the geolocated data to the second client according to the selected network path;
receiving, by the cell tower from a server associated with the interactive application, information describing a master state of geolocated data maintained by the server;
synchronizing the local state of the geolocated data with the master state;
receiving, from the first client, information describing an additional action associated with the geolocated data;
comparing the additional action to the local state of the geolocated data;
responsive to determining, based on the comparison, that the additional action conflicts with the local state of the geolocated data, denying the additional action; and
transmitting information describing the conflicting local state of the geolocated data to the first client.

13. The method of claim 12, wherein the master state reflects a second additional action by a third client device within an overlapping region between the geographic region and an additional geographic region surrounding an additional cell tower, and wherein synchronizing the local state of the geolocated data with the master state comprises:
determining, by the cell tower, that the second additional action conflicts with the action;
responsive to determining the second additional action conflicts with the action, updating the local state to reflect the second additional action instead of the action; and
transmitting information describing the updated local state of the geolocated data to the first client.

14. The method of claim 12, wherein the first client selected the network pathway by:
determining a score for each of the available network pathways using the one or more detected performance metrics;
ranking the plurality of available pathways according to the determined scores; and
selecting the available network pathway using the ranking.

15. The method of claim 12, wherein the one or more performance metrics include one or more a latency, jitter, data loss, connection stability, or bandwidth.

16. A system comprising:
a server;
a cell tower; and
a first client device connected to a second client device via a plurality of network pathways, the plurality of network pathways including a first network pathway through the server, a second network pathway through the cell tower, and a third network pathway through a local area network, the first client device configured to:
detect one or more performance metrics for each of the plurality of network pathways;
select, according to the one or more detected performance metrics, a network pathway from the plurality of network pathways for use in data transmission; and
transmit data to the second client device via the selected available network pathway, the data comprising data describing an action, requested by a user, associated with geolocated data;
wherein the cell tower is configured to:
provide peer-to-peer communication via a network pathway for clients within a geographic region surrounding the cell tower;
receive, from the first client within the geographic region, data and an indication of a network pathway, wherein the first client selected the network pathway based on one or more performance metrics for each of a plurality of available network pathways;
transmit, by the cell tower, the data to the second client within the geographic region according to the selected network pathway;
maintain a local state of geolocated data for an interactive application at the cell tower, the geolocated data associated with geographic positions within the geographic region surrounding the cell tower;
receive, from the first client, information describing the action associated with the geolocated data;
compare the action to the local state of the geolocated data;
responsive to determining, based on the comparison, the action does not conflict with the local state, update the local state to reflect the action;
transmit information describing the updated local state of the geolocated data to the second client according to the selected network path;
receive, from the server, information describing a master state of geolocated data maintained by the server;
synchronize the local state of the geolocated data with the master state;

receive, from the first client, information describing an additional action associated with the geolocated data;
compare the additional action to the local state of the geolocated data;
responsive to determining, based on the comparison, that the additional action conflicts with the local state of the geolocated data, deny the additional action; and
transmit information describing the conflicting local state of the geolocated data to the first client.

17. The system of claim 16, wherein the master state reflects a second additional action by a third client device within an overlapping region between the geographic region and an additional geographic region surrounding an additional cell tower, and wherein the synchronizing the local state of the geolocated data with the master state comprises:
determining, by the cell tower, that the second additional action conflicts with the action;
responsive to determining the second additional action conflicts with the action, updating the local state to reflect the second_additional action instead of the action; and
transmitting information describing the updated local state of the geolocated data to the first client.

18. The system of claim 16, wherein the first client selects the network pathway by:
determining a score for each of the available network pathways using the one or more detected performance metrics;
ranking the plurality of available pathways according to the determined scores; and
selecting the available network pathway using the ranking.

19. The system of claim 16, wherein the one or more performance metrics include one or more a latency, jitter, data loss, connection stability, or bandwidth.

20. The system of claim 16, wherein the first client device is further configured to:
select, according to the one or more detected performance metrics, an additional available network pathway from the plurality of available network pathways; and
transmit an additional copy of the data to the second client device via the additional available network pathway.

* * * * *

UNITED STATES PATENT AND TRADEMARK OFFICE
CERTIFICATE OF CORRECTION

| | | |
|---|---|---|
| PATENT NO. | : 11,489,763 B2 | Page 1 of 1 |
| APPLICATION NO. | : 17/127999 | |
| DATED | : November 1, 2022 | |
| INVENTOR(S) | : Turner et al. | |

It is certified that error appears in the above-identified patent and that said Letters Patent is hereby corrected as shown below:

In the Claims

In Column 18, in Claim 3, Line 13, delete "one or" and insert -- one or more --, therefor.

In Column 18, in Claim 4, Line 22, delete "one or" and insert -- one or more --, therefor.

In Column 21, in Claim 17, Line 22, delete "second_additional" and insert -- second additional --, therefor.

Signed and Sealed this
Twenty-fourth Day of January, 2023

Katherine Kelly Vidal
Director of the United States Patent and Trademark Office